US012587341B2

(12) United States Patent
Ryu et al.

(10) Patent No.: US 12,587,341 B2
(45) Date of Patent: Mar. 24, 2026

(54) DEMODULATION REFERENCE SIGNAL (DMRS) COMBINING FOR SINGLE DMRS CONFIGURATIONS

(71) Applicant: QUALCOMM Incorporated, San Diego, CA (US)

(72) Inventors: Jae Ho Ryu, San Diego, CA (US); Hari Sankar, San Diego, CA (US); Alexei Yurievitch Gorokhov, San Diego, CA (US); Jae Won Yoo, San Diego, CA (US); Hobin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 18/046,851

(22) Filed: Oct. 14, 2022

(65) Prior Publication Data

US 2024/0129087 A1 Apr. 18, 2024

(51) Int. Cl.
 *H04L 5/00* (2006.01)
 *H04W 72/23* (2023.01)
(52) U.S. Cl.
 CPC ........... *H04L 5/0051* (2013.01); *H04W 72/23* (2023.01)
(58) Field of Classification Search
 CPC ............... H04L 5/0051; H04L 25/0228; H04L 25/0204; H04L 5/0091; H04W 72/23
 USPC ......................................................... 370/336
 See application file for complete search history.

(56) References Cited

U.S. PATENT DOCUMENTS

| | | | |
|---|---|---|---|
| 2019/0109746 A1* | 4/2019 | Hosseini ............... | H04W 72/20 |
| 2019/0159181 A1 | 5/2019 | Manolakos et al. | |
| 2019/0222380 A1 | 7/2019 | Manolakos et al. | |
| 2022/0278880 A1* | 9/2022 | Matsumura ........... | H04J 13/004 |

FOREIGN PATENT DOCUMENTS

WO WO-2022061628 A1 3/2022

OTHER PUBLICATIONS

International Search Report and Written Opinion—PCT/US2023/074687—ISA/EPO—Jan. 25, 2024.

* cited by examiner

*Primary Examiner* — Rownak Islam
(74) *Attorney, Agent, or Firm* — QUALCOMM Incorporated

(57) ABSTRACT

Methods, systems, and devices for wireless communications are described. A user equipment may receive signaling that indicates one of a plurality of demodulation reference signal (DMRS) configurations for demodulating a downlink data channel in a slot or subslot. The UE may receive the signaling from a network entity, such as a base station, and the network entity may select the indicated DMRS configuration. The plurality of DMRS configurations may indicate whether DMRS combining is supported across the slot or subslot and a subsequent adjacent slot or subslot, and the plurality of DMRS configurations may include a configuration that is capable of indicating to the UE that a single DMRS is configured in the slot or subslot and is to be combined with a DMRS in a subsequent adjacent slot or subslot to demodulate the downlink data channel.

25 Claims, 6 Drawing Sheets

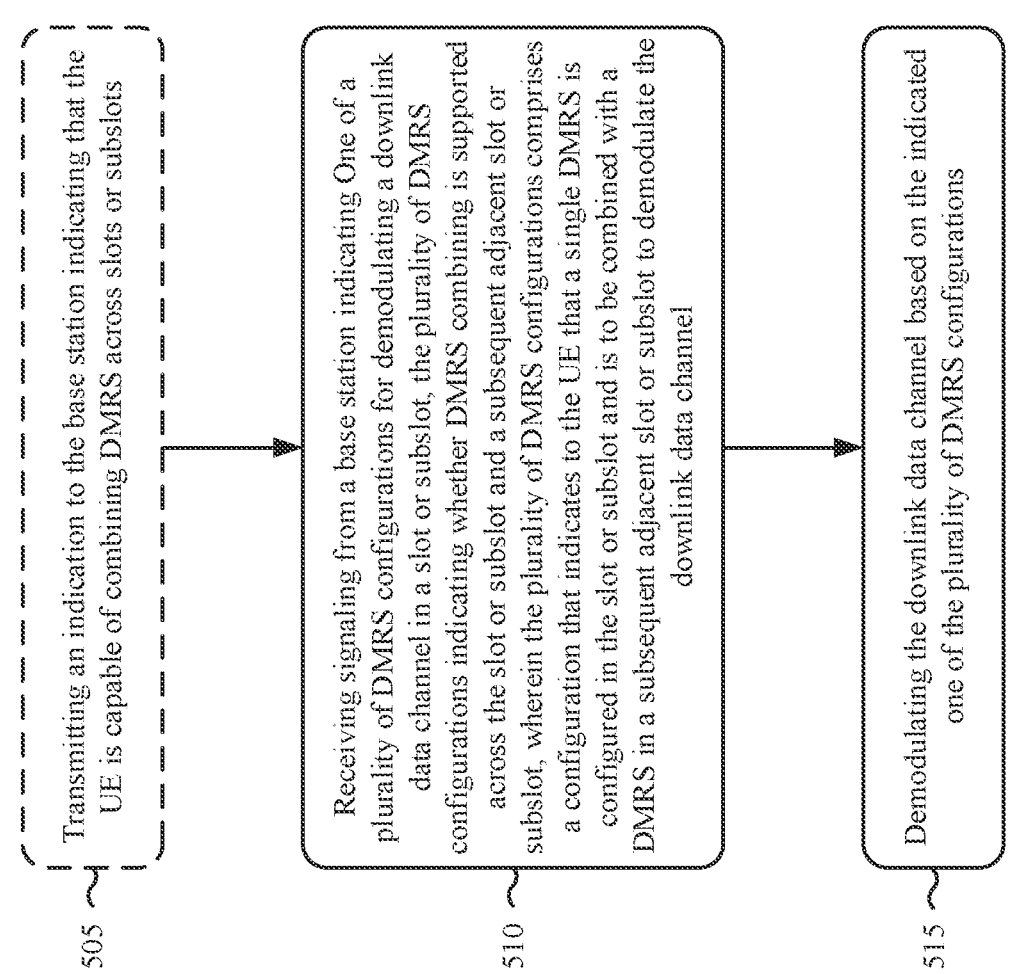

Transmitting an indication to the base station indicating that the UE is capable of combining DMRS across slots or subslots

505

Receiving signaling from a base station indicating One of a plurality of DMRS configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel

510

Demodulating the downlink data channel based on the indicated one of the plurality of DMRS configurations

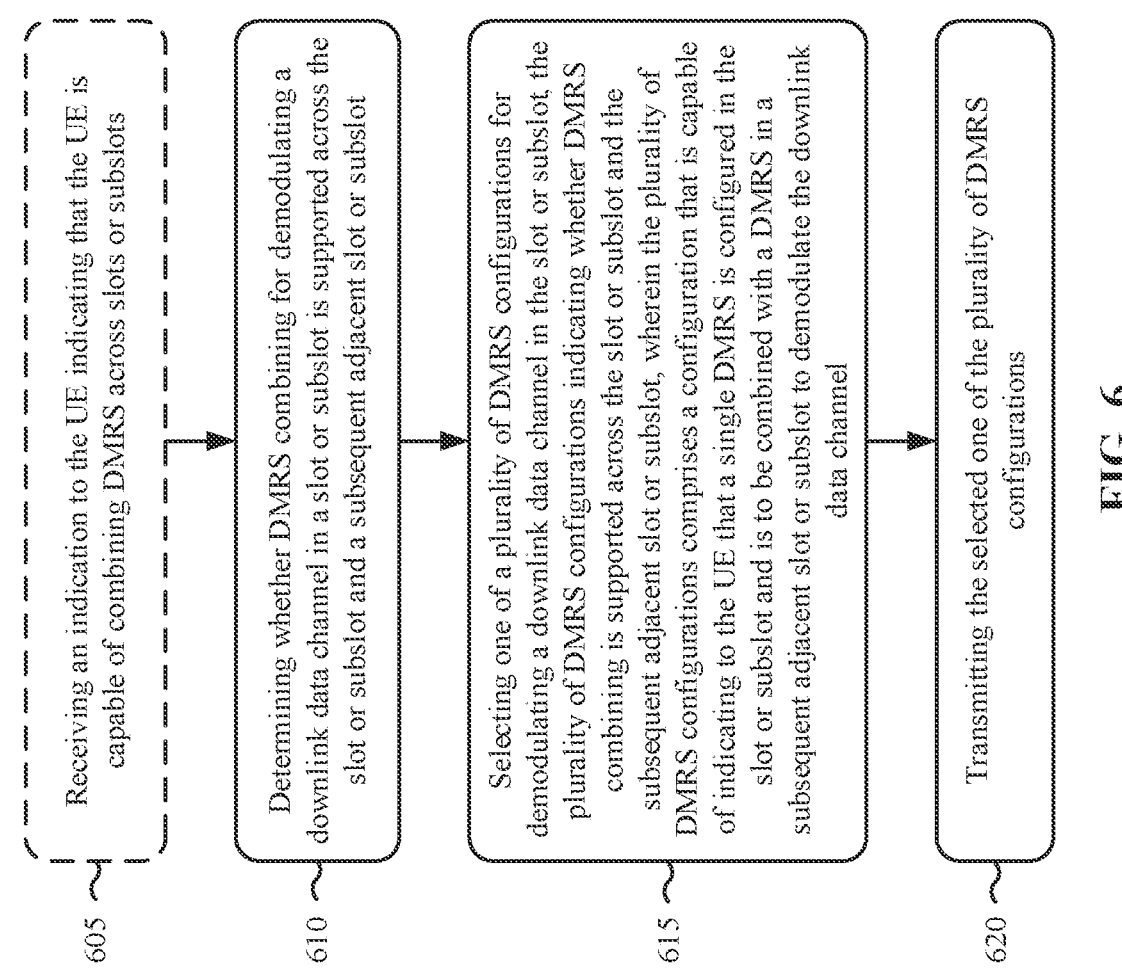

Receiving an indication to the UE indicating that the UE is capable of combining DMRS across slots or subslots

605

Determining whether DMRS combining for demodulating a downlink data channel in a slot or subslot is supported across the slot or subslot and a subsequent adjacent slot or subslot

610

Selecting one of a plurality of DMRS configurations for demodulating a downlink data channel in the slot or subslot the plurality of DMRS configurations indicating whether DMRS combining is supported across the slot or subslot and the subsequent adjacent slot or subslot, wherein the plurality of DMRS configurations comprises a configuration that is capable of indicating to the UE that a single DMRS is configured in the slot or subslot and is to be combined with a DMRS in a subsequent adjacent slot or subslot to demodulate the downlink data channel

615

Transmitting the selected one of the plurality of DMRS configurations

DEMODULATION REFERENCE SIGNAL (DMRS) COMBINING FOR SINGLE DMRS CONFIGURATIONS

FIELD OF THE DISCLOSURE

Aspects of the present disclosure generally relate to wireless communication and to techniques and apparatuses for demodulation reference signal (DMRS) combining across slots or subslots.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel; and demodulating the downlink data channel based on the indicated one of the plurality of DMRS configurations.

In some aspects, the UE transmits an indication to the base station indicating that the UE is capable of combining DMRS across scheduling periods, wherein the signaling received from the base station is based on the indication.

In some aspects, the signaling received from the base station is comprised in downlink control information (DCI). In those aspects, the downlink data channel may be a Physical Downlink Shared Channel (PDSCH), and the DCI may schedule the PDSCH in the slot or subslot. The signaling may comprises a field in the DCI indicating a configuration comprising one of a single DMRS in the slot or subslot to combine with the DMRS in the subsequent adjacent slot or subslot; a single DMRS in the slot or subslot which are not to be combined with a DMRS in the subsequent adjacent slot or subslot; two DMRS in the slot or subslot to combine with a DMRS in the subsequent adjacent slot or subslot; and two DMRS in the slot or subslot which are not to be combined with a DMRS in the subsequent adjacent slot or subslot. The number of DMRS per slot or subslot specified in the one of the plurality of DMRS configurations overrides a number of DMRS per slot or subslot specified by a radio resource control (RRC) configuration.

In some aspects, the one of the plurality of DMRS configurations may indicate to the UE that a single DMRS is configured in the slot or subslot and is to be combined with a DMRS in a subsequent adjacent slot or subslot to demodulate the downlink data channel and demodulating the downlink data channel based on the indicated one of the plurality of DMRS configurations comprises delaying channel estimation until reception of the DMRS in the subsequent adjacent slot or subslot. In those aspects, the number of symbols by which the processing timeline is relaxed may be the number of symbols in the slot or subslot.

In some aspects, the plurality of DMRS configurations may further indicate a number of slots or sub slots over which DMRS are to be combined. In those aspects, the one of the plurality of DMRS configurations may indicate to the UE that a single DMRS is configured in the slot or subslot and is to be combined with a DMRS in the next K slots or subslot to demodulate the downlink data channel and demodulating the downlink data channel based on the indicated one of the plurality of DMRS configurations comprises: delaying channel estimation until reception of the DMRS in the Kth subsequent slot or subslot; and relaxing a data channel processing timeline by the number of symbols in K slots or subslots.

In some aspects, the single DMRS may be received on one or two contiguous symbols. In some aspects, a DMRS configuration type 1 or DMRS configuration type 2 may be employed. In some aspects, a PDSCH mapping type A or a PDSCH mapping type B may be employed.

In some aspects, a method of wireless communication, performed by a base station, may include determining whether demodulation reference signal (DMRS) combining for demodulating a downlink data channel in a slot or subslot is supported across the slot or subslot and a subsequent adjacent slot or subslot; selecting one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to a UE that a single DMRS is configured in the slot or subslot and is to be combined with a DMRS in a subsequent adjacent slot or subslot to demodulate the downlink data channel; and transmitting the selected one of the plurality of DMRS configurations.

In some aspects, the base station may determine that DMRS combining for demodulating the downlink data channel in the slot or subslot is not supported across the slot or subslot and the subsequent adjacent slot or subslot based on one of: the slot or subslot being a last downlink slot or subslot in a time division duplex (TDD) operation; there being insufficient or no data to schedule in the subsequent adjacent slot or subslot; precoding having to be changed due to a multiple user multiple-input multiple-output (MU-MIMO) scheduling constraint; or a transmission configuration indication having to be changed due to beam management.

In some aspects, the base station may receive an indication from the UE indicating that the UE is capable of combining DMRS across scheduling periods, wherein determining whether DMRS combining for demodulating a downlink data channel in a slot or subslot is supported is based on the received indication.

In some aspects, an apparatus for wireless communication performed by a user equipment (UE) may include a memory and at least one processor operatively coupled to the memory. The memory and the one or more processors may be configured to cause the UE to: receive signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel; and demodulate the downlink data channel based on the indicated one of the plurality of DMRS configurations.

In some aspects, the memory and the at least one processor are further configured to cause the UE to transmit an indication to the base station indicating that the UE is capable of combining DMRS across scheduling periods, wherein the signaling received from the base station is based on the indication.

In some aspects, the signaling received from the base station may be comprised in downlink control information (DCI). In those aspects, the downlink data channel may be a Physical Downlink Shared Channel (PDSCH), and the DCI schedules the PDSCH in the slot or subslot. The signaling may comprises a field in the DCI indicating a configuration comprising one of a single DMRS in the slot or subslot to combine with the DMRS in the subsequent adjacent slot or subslot; a single DMRS in the slot or subslot which are not to be combined with a DMRS in the subsequent adjacent slot or subslot; two DMRS in the slot or subslot to combine with a DMRS in the subsequent adjacent slot or subslot; and two DMRS in the slot or subslot which are not to be combined with a DMRS in the subsequent adjacent slot or subslot. The number of DMRS per slot or subslot specified in the one of the plurality of DMRS configurations overrides a number of DMRS per slot or subslot specified by a radio resource control (RRC) configuration.

In some aspects, the one of the plurality of DMRS configurations may be configured to indicate to the UE that a single DMRS is configured in the slot or subslot and is to be combined with a DMRS in a subsequent adjacent slot or subslot to demodulate the downlink data channel, and the memory and the at least one processor are further configured to cause the UE to demodulate the downlink data channel based on the indicated one of the plurality of DMRS configurations by delaying channel estimation until reception of the DMRS in the subsequent adjacent slot or subslot. In those aspects, the number of symbols by which the processing timeline is relaxed may be the number of symbols in the slot or subslot.

In some aspects, the plurality of DMRS configurations may further be configured to indicate a number of slots or subslots over which DMRS are to be combined. In those aspects, the one of the plurality of DMRS configurations may be configured to indicate to the UE that a single DMRS is configured in the slot or subslot and is to be combined with a DMRS in the next K slots or subslot to demodulate the downlink data channel and the memory and the at least one processor are configured to cause the UE to demodulate the downlink data channel based on the indicated one of the plurality of DMRS configurations by: delaying channel estimation until reception of the DMRS in the Kth subsequent slot or subslot; and relaxing a data channel processing timeline by the number of symbols in K slots or subslots.

In some aspects, the single DMRS may be received on one or two contiguous symbols. In some aspects, a DMRS configuration type 1 or DMRS configuration type 2 may be employed. In some aspects, a PDSCH mapping type A or a PDSCH mapping type B may be employed.

In some aspects, an apparatus for wireless communication performed by a base station may include a memory and at least one processor operatively coupled to the memory. The memory and the one or more processors may be configured to cause the base station to: determine whether demodulation reference signal (DMRS) combining for demodulating a downlink data channel in a slot or subslot is supported across the slot or subslot and a subsequent adjacent slot or subslot; select one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to a UE that a single DMRS is configured in the slot or subslot and is to be combined with a DMRS in a subsequent adjacent slot or subslot to demodulate the downlink data channel; and transmit the selected one of the plurality of DMRS configurations.

In some aspects, the base station may be configured to determine that DMRS combining for demodulating the downlink data channel in the slot or subslot is not supported across the slot or subslot and the subsequent adjacent slot or subslot based on one of: the slot or subslot being a last downlink slot or subslot in a time division duplex (TDD) operation; there being insufficient or no data to schedule in the subsequent adjacent slot or subslot; precoding having to be changed due to a multiple user multiple-input multiple-output (MU-MIMO) scheduling constraint; or a transmission configuration indication having to be changed due to beam management.

In some aspects, the memory and the at least one processor may be further configured to cause the base station to receive an indication from the UE indicating that the UE is capable of combining DMRS across scheduling periods, wherein determining whether DMRS combining for demodulating a downlink data channel in a slot or subslot is supported is based on the received indication.

In some aspects, an apparatus for wireless communication performed by a user equipment (UE) may: means for receiving signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel; and means for demodulating the downlink data channel based on the indicated one of the plurality of DMRS configurations.

In some aspects, an apparatus for wireless communication performed by a base station may include: means for determining whether demodulation reference signal (DMRS) combining for demodulating a downlink data channel in a slot or subslot is supported across the slot or subslot and a subsequent adjacent slot or subslot; means for selecting one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to a UE that a single DMRS is configured in the slot or subslot and is to be combined with a DMRS in a subsequent adjacent slot or subslot to demodulate the downlink data channel; and means for transmitting the selected one of the plurality of DMRS configurations.

In some aspects, a non-transitory computer-readable medium may store one or more instructions for wireless communication. The one or more instructions, when executed by one or more processors of a UE, may cause the UE to: receive signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel; and demodulate the downlink data channel based on the indicated one of the plurality of DMRS configurations.

In some aspects, a non-transitory computer-readable medium may store one or more instructions for wireless communication. The one or more instructions, when executed by one or more processors of a base station, may cause the one or more processors of the base station to determine whether demodulation reference signal (DMRS)

combining for demodulating a downlink data channel in a slot or subslot is supported across the slot or subslot and a subsequent adjacent slot or subslot; select one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to a UE that a single DMRS is configured in the slot or subslot and is to be combined with a DMRS in a subsequent adjacent slot or subslot to demodulate the downlink data channel; and transmit the selected one of the plurality of DMRS configurations.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIG. 5 is a flowchart illustrating operations by a user equipment in accordance with one or more aspects of the present disclosure.

FIG. 6 is a flowchart illustrating operations by a base station in accordance with one or more aspects of the present disclosure.

Figure 1:
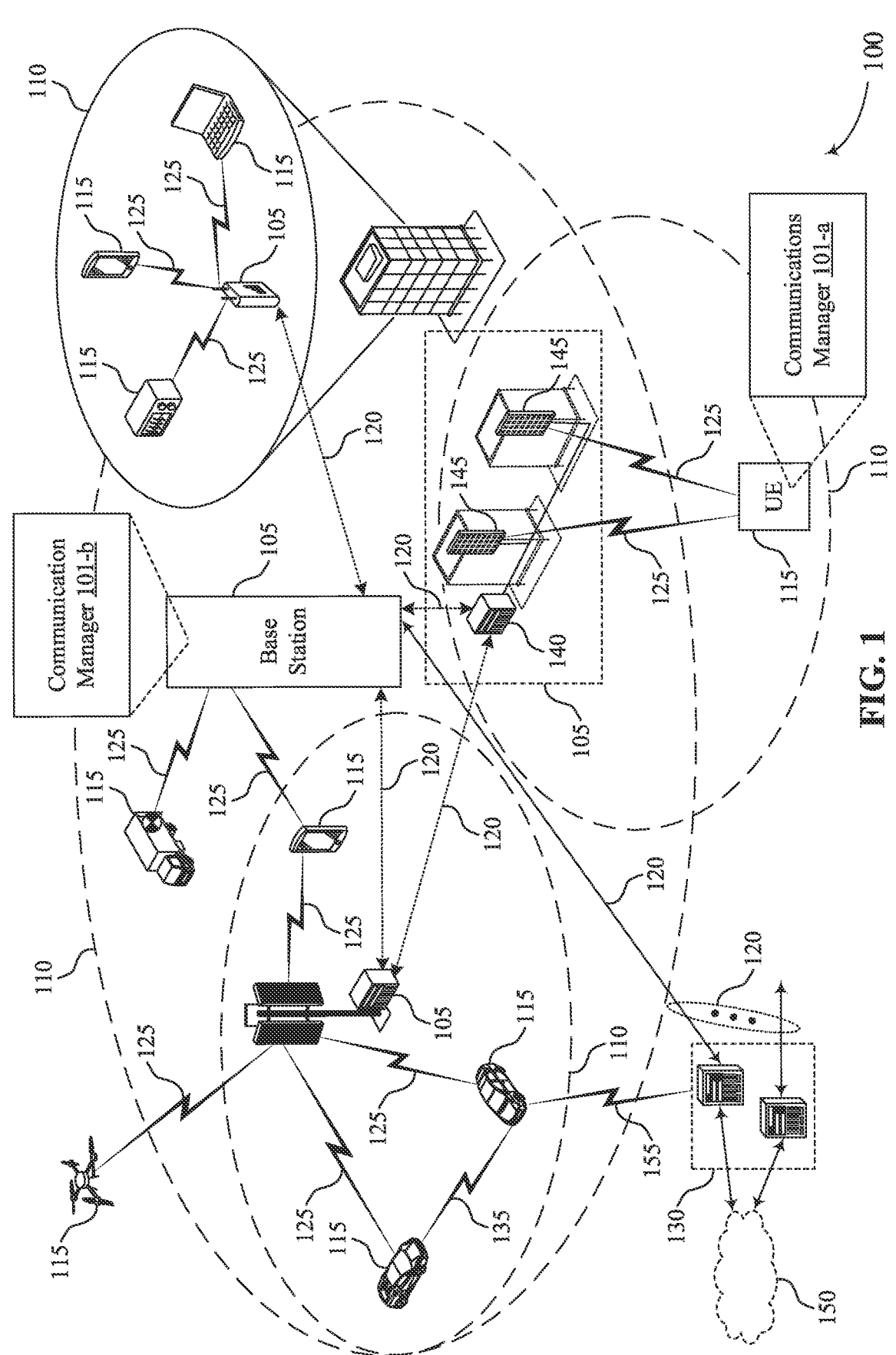
FIG. 1 illustrates an example of a wireless communications system that supports DMRS bundling in accordance with one or more aspects of the present disclosure.

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

In some wireless communication networks, such as NR networks, DMRS precoding may be different in different slots or subslots. Accordingly, unless specifically configured to expect the same DMRS precoding across adjacent slots, a UE cannot combine DMRS across adjacent slots for DMRS channel estimation of a downlink channel, such as a Physical Downlink Control Channel (PDSCH). Some networks allow for opportunistic configuration of a single DMRS per slot for PDSCH. Typically, a UE is configured with such a single DMRS when a base station detects that the UE is in a low mobility condition. In view of the low DMRS overhead from the single DMRS, the UE may achieve higher data throughput. PDSCH demodulation performance with a single DMRS per slot may however be sensitive to channel variation due to residual frequency tracking loop error or channel fading. In particular, code blocks in a last OFDM symbol in a slot may be liable to fail to decode correctly.

It has been identified that it would be beneficial to address performance degradation due to the use of a single DMRS per slot by allowing combining of DMRS symbols across adjacent slots. Such cross-slot DMRS combining, may even allow a single DMRS to be configured for a UE with medium mobility to achieve higher data throughput.

This application discloses methods, apparatuses and devices to enable cross-slot DMRS combining.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

One or more aspects of the disclosure are initially described in the context of wireless communications systems. One or more aspects of the disclosure are further illustrated by and described with reference to process flows, apparatus diagrams, system diagrams, and flowcharts that relate to distortion probing reference signals.

FIG. 1 illustrates an example of a wireless communications system 100 that supports distortion probing reference signals in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, a UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT-S-OFDM).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple subslots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a sub-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In various examples, a communication manager 101 may be included in a device to support DMRS combining across slots or sub slots. For example, a UE 115 may include a communications manager 101-*a*, or a base station may include a communications manager 101-*b*.

Figure 2:
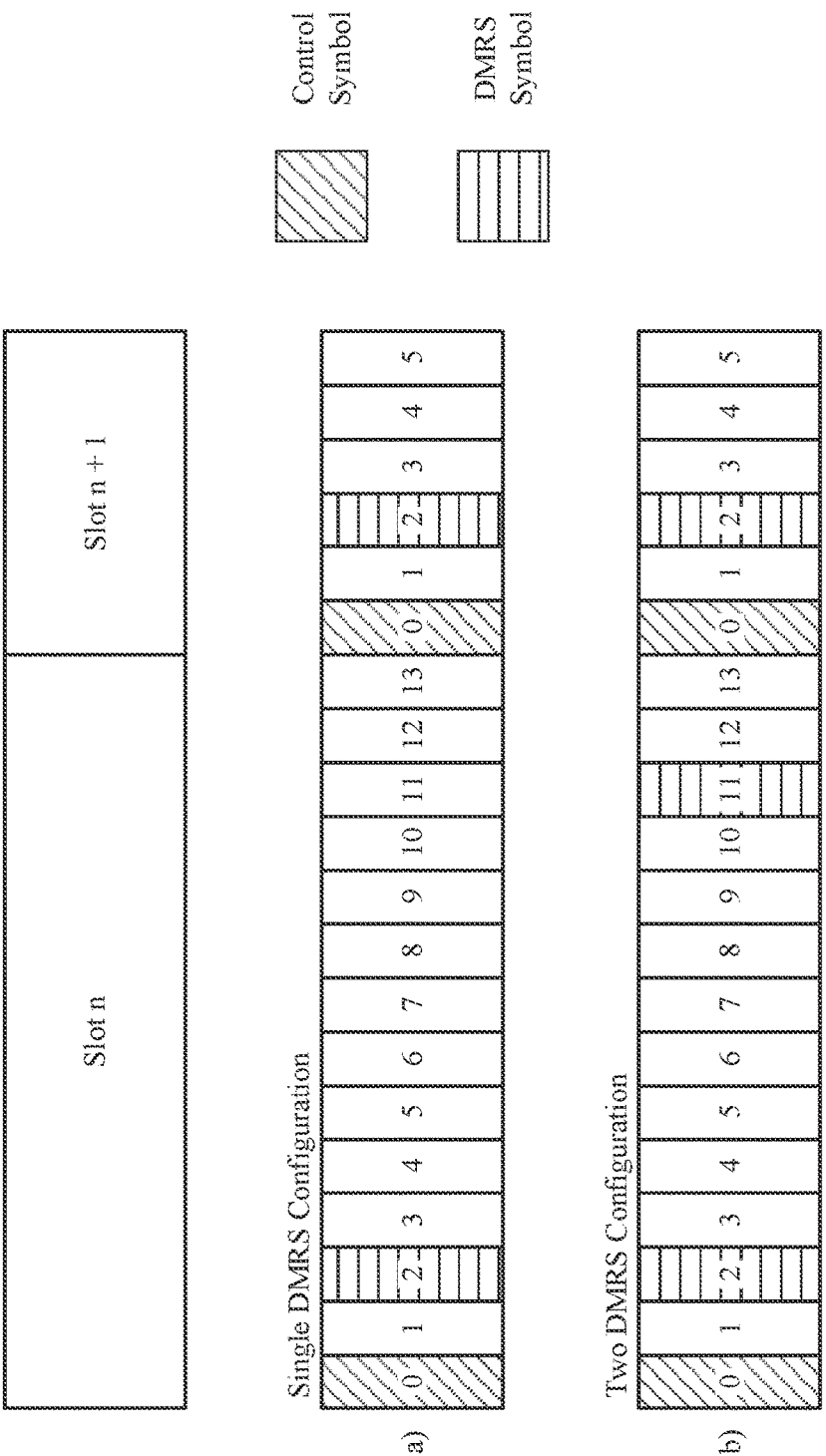
FIG. 2 illustrates both a single DMRS configuration and a two DMRS configuration for a slot in accordance with one or more aspects of the present disclosure.

FIG. 2 illustrates a single and a two DMRS configuration for a slot.

For downlink NR, DMRS is configured semi-statically through the radio resource control (RRC) information element DMRS-DownlinkConfig. The number of DMRS symbols in a slot is configured at least in part via the dmrs-AdditionalPosition field in DMRS-DownlinkConfig. A dmrs-AdditionalPosition value of 0 corresponds to use of a single DMRS, a dmrs-AdditionalPosition value of 1 corresponds to two DMRSs, a dmrs-AdditionalPosition value of 2 corresponds to three DMRSs and a dmrs-AdditionalPosition value of 3 corresponds to four DMRSs. Configuration a) of FIG. 2 shows a slot configuration when dmrs-AdditionalPosition=0. In this configuration, UE (115) may perform channel estimation based on a DMRS observation on one DMRS symbol and apply that to all symbols in the same slot. A UE cannot track frequency tracking loop error or channel variation due to fading because only a single DMRS observation can be made. Although a single DMRS symbol is shown, the length of a single DMRS in symbols may be longer than one symbol (for example, in NR the length in symbols of a DMRS may be controlled by a DMRS length parameter that can take values of 1 or 2 symbols). Even though two symbols may be used for a single DMRS, only a single DMRS observation is made so a frequency tracking loop error or channel variation due to fading cannot be interpolated based on multiple DMRS observations.

Configuration b) of FIG. 2 shows a slot configuration when dmrs–AdditionalPosition=0. In this configuration, UE (115) may perform channel estimation based on a DMRS observation on two DMRS symbols separated by a number of symbols. A UE can track frequency tracking loop error or channel variation due to fading by interpolating and/or extrapolating based on respective observations of the two DMRS symbols. As with configuration a), each DMRS may be more than one symbol long as controlled by a length parameter.

Use of a single DMRS configuration such as configuration a) of FIG. 2 enables improved data throughput compared to a two DMRS configuration such as configuration b) of FIG. 2. For example, for a physical resource block (PRB) of 12 subcarriers over a slot of 14 symbols (i.e. a frequency-time resource grid of 168 resource elements (REs)), a comparison of configurations a) and b) is shown in Table 1:

TABLE 1

|  | Two DMRS | Single DMRS |
|---|---|---|
| REs | 168 | 168 |
| PDCCH REs | 12 | 12 |
| DMRS REs | 24 | 12 |
| PDSCH REs | 132 | 144 |
| Throughput gain (%) | 0 | 10.9 |

As can be seen from Table 1, a throughput gain of 10.9% is possible for configuration a) compared to configuration b). A network may accordingly configure UEs in a UE-specific manner to use single DMRS configurations where possible. Typically, this is for UEs with low mobility as detected by a base station because channel variation is liable to be low for such UEs. The channel estimation from a single observation of the single DMRS may therefore be accurate for an entire slot or subslot. This accuracy is not however guaranteed if the channel varies more than expected. Even for completely stationary UEs, single DMRS demodulation performance may be degraded due to sensitivity to residual frequency tracking loop error.

It has been identified that demodulation performance degradation can be avoided if DMRS can be combined across different slots or subslots. While in principle performance might be improved by a UE unilaterally (without input from the network) determining to combine DMRS across slots or subslots, because in networks such as NR networks the precoding of DMRS can change between slots or subslots, combining DMRS from different slots or subslots may result in wholly inaccurate channel estimation. To enable the UE to be aware of when it can combine DMRS across slots or subslots to achieve accurate channel estimation, the present disclosure provides for a base station indicating to a UE whether DMRS may be combined across slots or subslots.

Figure 3:
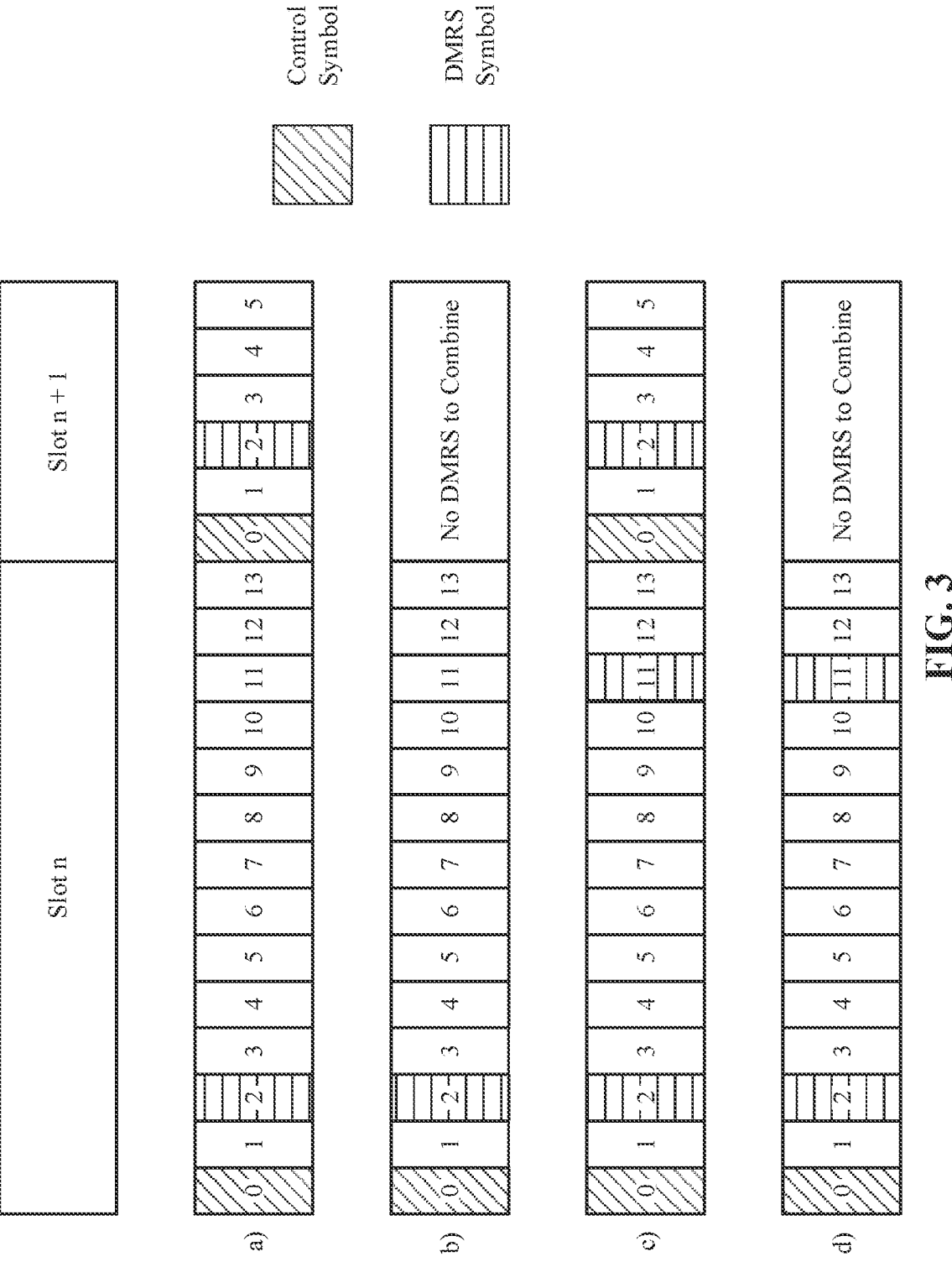
FIG. 3 illustrates an example indication scheme for indicating whether DMRS in adjacent slots or subslots may be combined to demodulate a data channel in accordance with one or more aspects of the present disclosure.

FIG. 3 illustrates an example indication scheme for indicating whether DMRS in adjacent slots or subslots may be combined to demodulate a data channel.

In one example, a field may be transmitted in downlink control information (DCI) that indicates one of four configurations. The field may be included in DCI that schedules PDSCH in slot n and may be termed a DMRS bundling indicator (DBI). Such an indicator is advantageous because the UE can be made aware of whether DMRS can be combined across slots each time it is scheduled in a slot without having to transmit separate control information. One field value may indicate that a single DMRS is transmitted in slot n and that it is to be combined with a DMRS symbol in a subsequent adjacent slot n+1 for channel estimation, as shown in configuration a). Another field value may indicate that a single DMRS is transmitted in slot n, but that it is not to be combined with a DMRS symbol in a subsequent adjacent slot n+1 for channel estimation, as shown in configuration b). Further field values may indicate that two DMRS are transmitted in slot n and they are to be combined with a DMRS symbol in a subsequent adjacent slot n+1 for channel estimation (configuration c)) or they are not to be combined with a DMRS symbol in a subsequent adjacent slot n+1 for channel estimation (configuration d)). In some examples, the DBI of FIG. 3 may be a 2-bit field with the four bit combinations representing each of the four configuration options.

The scheme shown in FIG. 3 not only allows a UE to combine DMRS across slots to achieve accurate channel estimation dynamically, but also allows the number of DMRS per slot to be updated dynamically, overriding the dmrs-AdditionalPosition field in the DMRS-DownlinkConfig. For example, it may be determined by the base station, based on the detected mobility of a UE (e.g. the base station may detect the mobility of the UE by monitoring how fast the UE's measurement for reference signal receive power (RSRP) changes over time), that the dmrs-AdditionalPosition field in the DMRS-DownlinkConfig should be set to the value '1' so that the UE is configured with two DMRS per slot. If however DMRS combining can be used in a slot, it may be determined that a single DMRS combined with a DMRS symbol in a subsequent adjacent slot is sufficient to achieve accurate channel estimation (e.g. different ranges of mobility may correspond to the different DBI field values, with the lowest mobility range corresponding to single DMRS without cross-slot combining, a next lowest mobility range corresponding to single DMRS with cross-slot combining, a next lowest range corresponding to two DMRSs without cross-slot combining, and a highest mobility range corresponding to two DMRSs with cross-slot combining). In this way, the UE can achieve higher throughput.

Other DBI schemes are also possible. For example, a field in the DCI that schedules a slot may simply indicate whether to combine DMRS across the slot and the subsequent adjacent slot, and the UE can use the dmrs-AdditionalPosition configured number of DMRS per slot. In this way, when the dmrs–AdditionalPosition=0 and the DBI indicates to combine DMRS across the slot and the subsequent adjacent slot, it implicitly indicates to the UE that a single DMRS is configured in the slot or subslot and is to be combined with a DMRS in a subsequent adjacent slot or subslot to demodulate the downlink data channel.

Whatever DBI scheme is employed, when cross-slot DMRS combining is configured for slot n, the UE waits until a DMRS in slot n+1 is received before performing channel estimation by combining the DMRS in slot n and n+1. This may impact the decoding timeline of the downlink data channel. When cross-slot DMRS combining is not configured for slot n, the UE uses DMRS symbols in current slot for DMRS channel estimation so the decoding timeline is unaffected.

Figure 4:
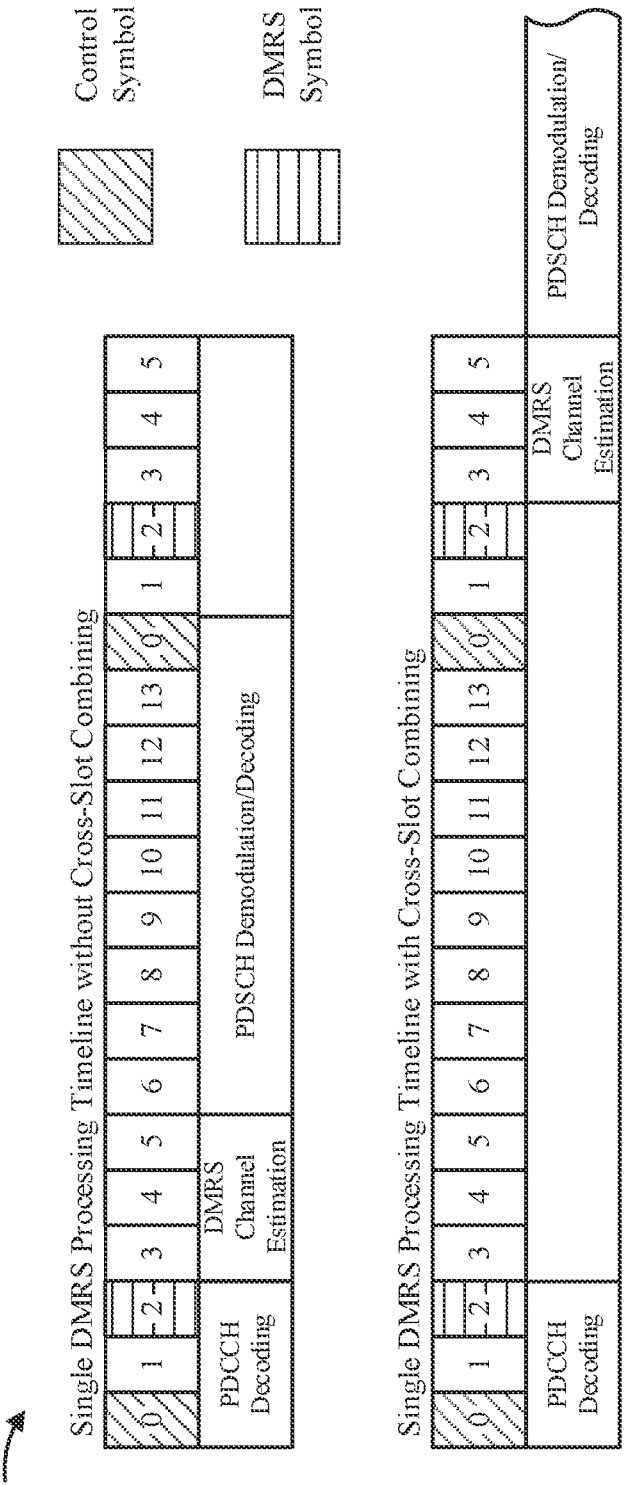
FIG. 4 illustrates different decoding timelines for different DMRS configurations in accordance with one or more aspects of the present disclosure.

FIG. 4 shows a comparison of decoding timelines for different DMRS configurations. Configuration a) shows the decoding timeline for a DMRS configuration with a single DMRS per slot and without cross-slot DMRS combining. The UE may receive a control channel in the first symbol of a slot. This channel may be a Physical Downlink Control Channel (PDCCH). In the example shown, it takes the UE 3 symbols to decode the PDCCH. By this time, the single DMRS in symbol 2 has been received, so the UE can immediately perform DMRS channel estimation based on the single DMRS. This takes a further 3 symbols. Once channel estimation is complete, the UE performs PDSCH demodulation and decoding. This process lasts 9 symbols, so that the entire PDSCH processing timeline lasts 15 symbols, ending 1 symbol after the end of the PDSCH.

Configuration b) shows the decoding timeline for a DMRS configuration with a single DMRS per slot and with cross-slot DMRS combining. Each individual process (PDCCH decoding, DMRS channel estimation, and PDSCH demodulation and decoding) takes the same number of symbols as for configuration a). However, the UE waits until after the DMRS in symbol 2 of the subsequent slot before it can begin DMRS channel estimation, and PDSCH demodulation and decoding. As shown, this leads to the entire PDSCH processing timeline lasting 29 symbols, ending 15 symbols after the end of the PDSCH.

Configuration c) shows the decoding timeline for a DMRS configuration with two DMRS per slot and without cross-slot DMRS combining. Each individual process (PDCCH decoding, DMRS channel estimation, and PDSCH demodulation and decoding) again takes the same number of symbols as for configuration a). In this configuration however, the UE waits until after the DMRS in symbol 11 of the slot before it can begin DMRS channel estimation, and PDSCH demodulation and decoding. As shown, this leads to the entire PDSCH processing timeline lasting 24 symbols, ending 10 symbols after the end of the PDSCH.

A UE is expected to complete PDSCH processing within a certain number (N1) of symbols from the end of a PDSCH. This number depends on the subcarrier spacing employed and whether dmrs-AdditionalPosition=0 or not. The values for the default PDSCH processing capability are shown in the first 3 columns of Table 2:

TABLE 2

| SCS (kHz) | dmrs-Addition-alPosition = 0 | dmrs-Addition-alPosition ≠ 0 | dmrs-Addition-alPosition = 0, with DMRS combining |
|---|---|---|---|
| 15 | 8 | 13/14 | 8 + R |
| 30 | 10 | 13 | 10 + R |
| 60 | 17 | 20 | 17 + R |
| 120 | 20 | 24 | 20 + R |

It may be seen that configurations a) and c) satisfy the timeline condition for their respective configurations with a 15 kHz subcarrier spacing (1 symbol <8 symbols for a), and 10 symbols <13/14 symbols for c)). PDSCH processing for configuration b) however ends 15 symbols after the end of the PDSCH compared to the 8 symbol processing time condition for 15 kHz subcarrier spacing in Table 2.

To address this concern, in some examples, when the DBI indicates to apply DMRS combining across slots, the UE may be configured to assume PDSCH processing is relaxed by R slots. This is shown in the fourth column of Table 2. The value of R is known by both the UE and base station and is sufficient to account for the maximum delay in processing due to DMRS combining in the subsequent adjacent slot. For example, as the combining in configuration b) effectively delays processing by a slot, R may take the value of the number of symbols in a slot, which is 14 for configuration b).

DMRS combining across slots may also affect the HARQ-ACK timeline for the PDSCH. The delay between PDSCH and the HARQ-ACK in slots may be defined by a parameter K1. When the DBI indicates to apply DMRS combining across slots, the base station may configure K1 to be relaxed by a slot.

In some examples, the DBI may indicate that DMRS is to be combined for channel estimation of PDSCH across the slot or subslot and K contiguous future slots or subslots adjacent the slot or subslot (i.e. not just across slots or subslots n and n+1, but across n, n+1, n+2, . . . , n+K). In these examples, the scheme of FIG. 3 may be modified to further indicate the number of slots or subslots across which DMRS are to be combined for channel estimation. Such examples allow for improved channel estimation performance because interpolation is itself improved by the additional number of DMRS observations.

In these examples, the UE may be configured to assume PDSCH processing is relaxed by R slots, where R is known by both the UE and base station and is sufficient to account for the maximum delay in processing due to DMRS combining in the subsequent K adjacent slots. R may be determined by the UE and the base station based on K. For example, R may be determined to be the number of symbols in K slots or subslots.

It may not always be possible for the base station to configure DMRS combining across slots or subslots. For example, if a base station determines that the slot or subslot is a last downlink slot or subslot in a time division duplex operation (TDD), it may not configure DMRS combining across slots or subslots. Similarly, if there is no or insufficient data to schedule in the subsequent adjacent slot or subslot, the base station may not configure DMRS combining across slots or subslots. In other circumstances, precoding or a transmission configuration indication (TCI) having to be changed between the slot or subslot and the subsequent adjacent slot or subslot may prevent configuration of DMRS combining across slots or subslots. For example, if a base station determines that precoding has to be changed due to a multiple user multiple-input multiple-output (MU-MIMO) scheduling constraint, it may not configure DMRS combining across slots or subslots. Similarly, if a TCI has to be changed due to beam management, the base station may not configure DMRS combining across slots or subslots.

Although FIGS. 2-4 focus on DMRS combining across slots, it is noted that aspects of the present disclosure provide for DMRS combining across subslots. While the shorter duration of subslots compared to slots mean that demodulation performance is less likely to suffer from degradation due to channel variability or residual frequency tracking loop error, in high channel variability conditions or where a frequency tracking loop is unreliable, combining DMRS across subslots may still improve demodulation performance. It is further noted that when aspects of the present disclosure are implemented in an NR system or a network derivative thereof, the aspects apply whether or not DMRS configuration type 1 or 2 is employed, or whether PDSCH mapping type A or PDSCH mapping type B is employed, as defined in NR standards.

FIG. 5 shows a flowchart illustrating a method 500 that supports DMRS combining across slots or subslots in accordance with aspects of the present disclosure. The operations of method 600 may be implemented by a UE 115 or its components as described herein. In some examples, a UE may execute a set of instructions to control the functional elements of the UE to perform the functions described herein. Additionally or alternatively, a UE may perform aspects of the functions described herein using special-purpose hardware.

Optionally at 505, a UE transmits an indication to the base station indicating that the UE is capable of combining DMRS across slots or subslots.

At 510, a UE receives signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel.

At 515, a UE demodulates the downlink data channel based on the indicated one of the plurality of DMRS configurations.

FIG. 6 shows a flowchart illustrating a method 600 that supports DMRS combining across slots or subslots in accordance with aspects of the present disclosure. The operations of method 600 may be implemented by a base station 105 or its components as described herein. In some examples, a base station may execute a set of instructions to control the functional elements of the base station to perform the functions described herein. Additionally or alternatively, a base station may perform aspects of the functions described herein using special-purpose hardware.

Optionally at 605, a base station receives an indication from a UE indicating that the UE is capable of combining DMRS across scheduling periods.

At 610, the base station determines whether demodulation reference signal (DMRS) combining for demodulating a downlink data channel in a slot or subslot is supported across the slot or subslot and a subsequent adjacent slot or subslot.

At 615, the base station selects one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to the UE that a single DMRS is configured in the slot or subslot and is to be combined with a DMRS in a subsequent adjacent slot or subslot to demodulate the downlink data channel.

At 620, the base station transmits the selected one of the plurality of DMRS configurations.

It should be noted that the methods described herein describe possible implementations, and that the operations may be rearranged or otherwise modified and that other implementations are possible. Further, aspects from two or more of the methods may be combined.

Aspect 1: A method of wireless communication performed by a user equipment (UE), the method comprising: receiving signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel; and demodulating the downlink data channel based on the indicated one of the plurality of DMRS configurations.

Aspect 2: The method of aspect 1, further comprising transmitting an indication to the base station indicating that the UE is capable of combining DMRS across scheduling periods, wherein the signaling received from the base station is based on the indication.

Aspect 3: The method of aspect 1 or 2, wherein the signaling received from the base station is comprised in downlink control information (DCI).

Aspect 4: The method of aspect 3, wherein the downlink data channel is a Physical Downlink Shared Channel (PDSCH), and the DCI schedules the PDSCH in the slot or subslot.

Aspect 5: The method of aspect 4, wherein the signaling comprises a field in the DCI indicating a configuration comprising one of: a single DMRS in the slot or subslot to combine with the DMRS in the subsequent adjacent slot or subslot; a single DMRS in the slot or subslot which are not to be combined with a DMRS in the subsequent adjacent slot or subslot; two DMRS in the slot or subslot to combine with a DMRS in the subsequent adjacent slot or subslot; and two DMRS in the slot or subslot which are not to be combined with a DMRS in the subsequent adjacent slot or subslot.

Aspect 6: The method of aspect 5, wherein the number of DMRS per slot or subslot specified in the one of the plurality of DMRS configurations overrides a number of DMRS per slot or subslot specified by a radio resource control (RRC) configuration.

Aspect 7: The method of any of aspects 1-6, wherein the one of the plurality of DMRS configurations indicates to the UE that a single DMRS is configured in the slot or subslot and is to be combined with a DMRS in a subsequent adjacent slot or subslot to demodulate the downlink data channel and demodulating the downlink data channel based on the indicated one of the plurality of DMRS configurations comprises delaying channel estimation until reception of the DMRS in the subsequent adjacent slot or subslot.

Aspect 8: The method of aspect 7, wherein the UE is configured to relax a data channel processing timeline by a number of symbols that exceeds a maximum delay in processing due to DMRS combining in the subsequent adjacent slot or subslot.

Aspect 9: The method of aspect 8, wherein the number of symbols by which the processing timeline is relaxed is the number of symbols in the slot or subslot.

Aspect 10: The method of any of aspects 1-3, wherein the plurality of DMRS configurations further indicate a number of slots or subslots over which DMRS are to be combined.

Aspect 11: The method of claim 10, wherein the one of the plurality of DMRS configurations indicates to the UE that a single DMRS is configured in the slot or subslot and is to be combined with a DMRS in the next K slots or subslot to demodulate the downlink data channel and demodulating the downlink data channel based on the indicated one of the plurality of DMRS configurations comprises: delaying channel estimation until reception of the DMRS in the Kth subsequent slot or subslot; and relaxing a data channel processing timeline by the number of symbols in K slots or subslots.

Aspect 12: The method of any of aspects 1-11, wherein the single DMRS is received on one or two contiguous symbols.

Aspect 13: The method of any of aspects 1-12, wherein a DMRS configuration type 1 or DMRS configuration type 2 is employed.

Aspect 14: The method of any of aspects 1-13, wherein a PDSCH mapping type A or a PDSCH mapping type B is employed.

Aspect 15: A method of wireless communication by a base station, the method comprising: determining whether demodulation reference signal (DMRS) combining for demodulating a downlink data channel in a slot or subslot is supported across the slot or subslot and a subsequent adjacent slot or subslot; selecting one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to a UE that a single DMRS is configured in the slot or subslot and is to be combined with a DMRS in a subsequent adjacent slot or subslot to demodulate the downlink data channel; and transmitting the selected one of the plurality of DMRS configurations.

Aspect 16: The method of aspect 15, wherein the base station determines that DMRS combining for demodulating the downlink data channel in the slot or subslot is not supported across the slot or subslot and the subsequent adjacent slot or subslot based on one of: the slot or subslot being a last downlink slot or subslot in a time division duplex (TDD) operation; there being insufficient or no data to schedule in the subsequent adjacent slot or subslot; precoding having to be changed due to a multiple user multiple-input multiple-output (MU-MIMO) scheduling constraint; or a transmission configuration indication having to be changed due to beam management.

Aspect 17: The method of aspect 15 or 16, further comprising receiving an indication from the UE indicating that the UE is capable of combining DMRS across scheduling periods, wherein determining whether DMRS combining for demodulating a downlink data channel in a slot or subslot is supported is based on the received indication.

Aspect 18: An apparatus for wireless communication performed by a user equipment (UE), the apparatus comprising: a memory; and at least one processor operatively coupled to the memory, wherein the memory and the at least one processor are configured to cause the UE to: receive signaling from a base station indicating one of a plurality of demodulation reference signal (DMRS) configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel; and demodulate the downlink data channel based on the indicated one of the plurality of DMRS configurations.

Aspect 19: The apparatus of aspect 18, wherein the memory and the at least one processor are further configured to cause the UE to transmit an indication to the base station indicating that the UE is capable of combining DMRS across scheduling periods, wherein the signaling received from the base station is based on the indication.

Aspect 20: The apparatus of aspect 18 or 19, wherein the signaling received from the base station is comprised in downlink control information (DCI).

Aspect 21: The apparatus of aspect 20, wherein the downlink data channel is a Physical Downlink Shared Channel (PDSCH), and the DCI schedules the PDSCH in the slot or subslot.

Aspect 22: The apparatus of aspect 21, wherein the signaling comprises a field in the DCI indicating a configuration comprising one of: a single DMRS in the slot or subslot to combine with the DMRS in the subsequent adjacent slot or subslot; a single DMRS in the slot or subslot which are not to be combined with a DMRS in the subsequent adjacent slot or subslot; two DMRS in the slot or subslot to combine with a DMRS in the subsequent adjacent slot or subslot; and two DMRS in the slot or subslot which are not to be combined with a DMRS in the subsequent adjacent slot or subslot.

Aspect 23: The apparatus of aspect 22, wherein the number of DMRS per slot or subslot specified in the one of the plurality of DMRS configurations is configured to override a number of DMRS per slot or subslot specified by a radio resource control (RRC) configuration.

Aspect 24: The apparatus of any of aspects 18-23, wherein the one of the plurality of DMRS configurations is configured to indicate to the UE that a single DMRS is configured in the slot or subslot and is to be combined with a DMRS in a subsequent adjacent slot or subslot to demodulate the downlink data channel, and the memory and the at least one processor are further configured to cause the UE to demodulate the downlink data channel based on the indicated one of the plurality of DMRS configurations by: delaying channel estimation until reception of the DMRS in the subsequent adjacent slot or subslot.

Aspect 25: The apparatus of aspect 24, wherein the UE is configured to relax a data channel processing timeline by a number of symbols that exceeds a maximum delay in processing due to DMRS combining in the subsequent adjacent slot or subslot.

Aspect 26: The apparatus of aspect 25, wherein the number of symbols by which the processing timeline is relaxed is the number of symbols in the slot or subslot.

Aspect 27: The apparatus of any of aspects 18-21, wherein the plurality of DMRS configurations is further configured to indicate a number of slots or subslots over which DMRS are to be combined.

Aspect 28: The apparatus of aspect 27, wherein the one of the plurality of DMRS configurations is configured to indicate to the UE that a single DMRS is configured in the slot or subslot and is to be combined with a DMRS in the next K slots or subslot to demodulate the downlink data channel and the memory and the at least one processor are further configured to cause the UE to demodulate the downlink data channel based on the indicated one of the plurality of DMRS configurations by: delaying channel estimation until reception of the DMRS in the Kth subsequent slot or subslot; and relaxing a data channel processing timeline by the number of symbols in K slots or subslots.

Aspect 29: An apparatus wireless communication by a base station, the apparatus comprising: a memory; and at least one processor operatively coupled to the memory, wherein the memory and the at least one processor are configured to cause the base station to: determine whether demodulation reference signal (DMRS) combining for demodulating a downlink data channel in a slot or subslot is supported across the slot or subslot and a subsequent adjacent slot or subslot; select one of a plurality of DMRS configurations for demodulating a downlink data channel in the slot or subslot, the plurality of DMRS configurations indicating whether DMRS combining is supported across the slot or subslot and the subsequent adjacent slot or subslot, wherein the plurality of DMRS configurations comprises a configuration that is capable of indicating to a UE that a single DMRS is configured in the slot or subslot and is to be combined with a DMRS in a subsequent adjacent slot or subslot to demodulate the downlink data channel; and transmit the selected one of the plurality of DMRS configurations.

Aspect 30: The apparatus of aspect 29, wherein the base station is configured to determine that DMRS combining for demodulating the downlink data channel in the slot or subslot is not supported across the slot or subslot and the subsequent adjacent slot or subslot based on one of: the slot or subslot being a last downlink slot or subslot in a time division duplex (TDD) operation; there being insufficient or no data to schedule in the subsequent adjacent slot or subslot; precoding having to be changed due to a multiple user multiple-input multiple-output (MU-MIMO) scheduling constraint; or a transmission configuration indication having to be changed due to beam management.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method of wireless communication performed by a user equipment (UE), the method comprising:
   transmitting an indication to a base station indicating that the UE is capable of combining demodulation reference signals (DMRS) across scheduling periods;
   receiving, from the base station based at least in part on the indication, signaling indicating one of a plurality of DMRS configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel;
   delaying, based at least in part on receiving the signaling indicating one of the plurality of DMRS configurations, channel estimation until reception of the DMRS in the subsequent adjacent slot or subslot; and
   demodulating the downlink data channel based on the indicated one of the plurality of DMRS configurations and delaying the channel estimation.

2. The method of claim 1, wherein the signaling received from the base station is comprised in downlink control information (DCI).

3. The method of claim 2, wherein the downlink data channel is a Physical Downlink Shared Channel (PDSCH), and the DCI schedules the PDSCH in the slot or subslot.

4. The method of claim 3, wherein the signaling comprises a field in the DCI indicating a configuration comprising one of:
   a single DMRS in the slot or subslot to combine with the DMRS in the subsequent adjacent slot or subslot;
   a single DMRS in the slot or subslot which are not to be combined with a DMRS in the subsequent adjacent slot or subslot;
   two DMRS in the slot or subslot to combine with a DMRS in the subsequent adjacent slot or subslot; and
   two DMRS in the slot or subslot which are not to be combined with a DMRS in the subsequent adjacent slot or subslot.

5. The method of claim 4, wherein a number of DMRS per slot or subslot specified in the one of the plurality of DMRS configurations overrides a number of DMRS per slot or subslot specified by a radio resource control (RRC) configuration.

6. The method of claim 1, wherein the UE is configured to relax a data channel processing timeline by a number of symbols that exceeds a maximum delay in processing due to DMRS combining in the subsequent adjacent slot or subslot.

7. The method of claim 6, wherein the number of symbols by which the processing timeline is relaxed is the number of symbols in the slot or subslot.

8. The method of claim 1, wherein the plurality of DMRS configurations further indicate a number of slots or subslots over which DMRS are to be combined.

9. The method of claim 8, wherein the one of the plurality of DMRS configurations indicates to the UE that a single DMRS is configured in the slot or subslot and is to be combined with a DMRS in a next K slots or subslot to demodulate the downlink data channel and demodulating the downlink data channel based on the indicated one of the plurality of DMRS configurations comprises:

delaying channel estimation until reception of the DMRS in the Kth subsequent slot or subslot; and relaxing a data channel processing timeline by a number of symbols in K slots or subslots.

10. The method of claim 1, wherein the single DMRS is received on one or two contiguous symbols.

11. The method of claim 1, wherein a DMRS configuration type 1 or DMRS configuration type 2 is employed.

12. The method of claim 1, wherein a PDSCH mapping type A or a PDSCH mapping type B is employed.

13. A method of wireless communication by a base station, the method comprising:

receiving an indication from a user equipment (UE) indicating that the UE is capable of combining demodulation reference signals (DMRSs) across scheduling periods;

determining, based at least in part on the received indication, that DMRS combining for demodulating a downlink data channel in a slot or subslot is supported across the slot or subslot and a subsequent adjacent slot or subslot;

selecting one of a plurality of DMRS configurations for demodulating the downlink data channel in the slot or subslot, the plurality of DMRS configurations indicating whether the DMRS combining is supported across the slot or subslot and the subsequent adjacent slot or subslot, wherein the plurality of DMRS configurations comprises a configuration that is capable of indicating to the UE that a single DMRS is configured in the slot or subslot and is to be combined with a DMRS in a subsequent adjacent slot or subslot to demodulate the downlink data channel, and wherein the indication that the single DMRS is to be combined with the DMRS in the subsequent adjacent slot or subslot further indicates to the UE that channel estimation is to be delayed until reception of the DMRS in the subsequent adjacent slot or subslot; and transmitting the selected one of the plurality of DMRS configurations.

14. The method of claim 13, wherein the base station determines that DMRS combining for demodulating the downlink data channel in the slot or subslot is not supported across the slot or subslot and the subsequent adjacent slot or subslot based on one of:

the slot or subslot being a last downlink slot or subslot in a time division duplex (TDD) operation;

there being insufficient or no data to schedule in the subsequent adjacent slot or subslot;

precoding having to be changed due to a multiple user multiple-input multiple-output (MU-MIMO) scheduling constraint; or a transmission configuration indication (TCI) having to be changed due to beam management.

15. An apparatus for wireless communication performed by a user equipment (UE), the apparatus comprising:

a memory; and at least one processor operatively coupled to the memory, wherein the memory and the at least one processor are configured to cause the UE to:

transmit an indication to a base station indicating that the UE is capable of combining demodulation reference signals (DMRS) across scheduling periods;

receive, from the base station based at least in part on the indication, signaling indicating one of a plurality of DMRS configurations for demodulating a downlink data channel in a slot or subslot, the plurality of DMRS configurations indicating whether DMRS combining is supported across the slot or subslot and a subsequent adjacent slot or subslot, wherein the plurality of DMRS configurations comprises a configuration that indicates to the UE that a single DMRS is configured in the slot or subslot and is to be combined with a DMRS in a subsequent adjacent slot or subslot to demodulate the downlink data channel;

delay, based at least in part on the reception of the signaling indicating one of the plurality of DMRS configurations, channel estimation until reception of the DMRS in the subsequent adjacent slot or subslot; and demodulate the downlink data channel based on the indicated one of the plurality of DMRS configurations and the delay of the channel estimation.

16. The apparatus of claim 15, wherein the signaling received from the base station is comprised in downlink control information (DCI).

17. The apparatus of claim 16, wherein the downlink data channel is a Physical Downlink Shared Channel (PDSCH), and the DCI schedules the PDSCH in the slot or subslot.

18. The apparatus of claim 17, wherein the signaling comprises a field in the DCI indicating a configuration comprising one of:

a single DMRS in the slot or subslot to combine with the DMRS in the subsequent adjacent slot or subslot;

a single DMRS in the slot or subslot which are not to be combined with a DMRS in the subsequent adjacent slot or subslot;

two DMRS in the slot or subslot to combine with a DMRS in the subsequent adjacent slot or subslot; and two DMRS in the slot or subslot which are not to be combined with a DMRS in the subsequent adjacent slot or subslot.

19. The apparatus of claim 18, wherein a number of DMRS per slot or subslot specified in the one of the plurality of DMRS configurations is configured to override a number of DMRS per slot or subslot specified by a radio resource control (RRC) configuration.

20. The apparatus of claim 15, wherein the UE is configured to relax a data channel processing timeline by a number of symbols that exceeds a maximum delay in processing due to DMRS combining in the subsequent adjacent slot or subslot.

21. The apparatus of claim 20, wherein the number of symbols by which the processing timeline is relaxed is the number of symbols in the slot or subslot.

22. The apparatus of claim 15, wherein the plurality of DMRS configurations is further configured to indicate a number of slots or subslots over which DMRS are to be combined.

23. The apparatus of claim 22, wherein the one of the plurality of DMRS configurations is configured to indicate to the UE that a single DMRS is configured in the slot or subslot and is to be combined with a DMRS in a next K slots or subslot to demodulate the downlink data channel and the memory and the at least one processor are further configured to cause the UE to demodulate the downlink data channel based on the indicated one of the plurality of DMRS configurations by:

delaying channel estimation until reception of the DMRS in the Kth subsequent slot or subslot; and relaxing a data channel processing timeline by a number of symbols in K slots or subslots.

24. An apparatus for wireless communication by a base station, the apparatus comprising:

a memory; and at least one processor operatively coupled to the memory, wherein the memory and the at least one processor are configured to cause the base station to:

receive an indication from a user equipment (UE) indicating that the UE is capable of combining demodulation reference signals (DMRSs) across scheduling periods;

determine, based at least in part on the received indication, that DMRS combining for demodulating a downlink data channel in a slot or subslot is supported across the slot or subslot and a subsequent adjacent slot or subslot;

select one of a plurality of DMRS configurations for demodulating the downlink data channel in the slot or subslot, the plurality of DMRS configurations indicating whether the DMRS combining is supported across the slot or subslot and the subsequent adjacent slot or subslot, wherein the plurality of DMRS configurations comprises a configuration that is capable of indicating to the UE that a single DMRS is configured in the slot or subslot and is to be combined with a DMRS in a subsequent adjacent slot or subslot to demodulate the downlink data channel, and wherein the indication that the single DMRS is to be combined with the DMRS in the subsequent adjacent slot or subslot further indicates to the UE that channel estimation is to be delayed until reception of the DMRS in the subsequent adjacent slot or subslot; and transmit the selected one of the plurality of DMRS configurations.

25. The apparatus of claim 24, wherein the base station is configured to determine that DMRS combining for demodulating the downlink data channel in the slot or subslot is not supported across the slot or subslot and the subsequent adjacent slot or subslot based on one of:

the slot or subslot being a last downlink slot or subslot in a time division duplex (TDD) operation;

there being insufficient or no data to schedule in the subsequent adjacent slot or subslot;

precoding having to be changed due to a multiple user multiple-input multiple-output (MU-MIMO) scheduling constraint; or a transmission configuration indication (TCI) having to be changed due to beam management.

\* \* \* \* \*